Patented Oct. 25, 1949

2,486,201

UNITED STATES PATENT OFFICE 2,486,201

RESIN FOR LOW-PRESSURE PAPER BASE LAMINATES AND WOOD SURFACING

Donald G. Patterson, Darien, Conn., assignor to American Cyanamid Company, New York, N. Y., a corporation of Maine No Drawing. Application March 2, 1945, Serial No. 580,711

1 Claim. (Cl. 260—45.3)

This invention relates to polymerizable compositions suitable for the manufacture of resin bonded paper laminates and also suitable for use in coating compositions for the production of smooth, craze-resistant coatings on surfaces such as wood or paper laminates.

Polymerizable compositions containing an unsaturated alkyd resin and a substance containing the $CH_2=C<$ group have been proposed for use in the manufacture of paper laminates, but their use has been somewhat limited because frequently laminates are obtained which do not have a sufficiently strong bond between the individual plies of the laminate. This is apparently due to the fact that polymerizable compositions of the aforementioned type do not readily wet the paper fibers and are not particularly compatible with cellulose. Laminates may be prepared using polymerizable compositions of the type described above at low pressures, that is to say, pressures of the order of less than 100 p. s. i. Accordingly, it would be desirable to be able to produce high strength uniform products utilizing copolymerizable compositions described above in order to avoid the use of high pressures which are necessary for many of the resin binders in general use in the manufacture of paper laminates. For example it is customary to employ pressures of 1500 p. s. i. or more in fabricating laminated materials of paper wherein urea-formaldehyde resins, melamine-formaldehyde resins or phenol-formaldehyde resins are used. The use of high pressures require expensive processes and the total production of laminates requiring high pressures is limited by the availability of the necessary equipment.

The production of plywood having a glossy, craze-resistant surface integrally bonded therewith, has often been attempted with very little success. This is primarily due to the fact that compositions which have been used have required such high pressures that any coating which was applied to the surface would be very thin. Other coating materials not requiring high pressures do not have sufficient adhesion to the surface. Urea- and melamine-formaldehyde condensation products are examples of the first of the aforementioned types of materials, whereas, copolymerizable compositions containing an unsaturated alkyd resin and a substance containing the $CH_2=C<$ group are examples of the second type of coating material.

An object of the present invention is to provide a compatible composition including a melamine-formaldehyde resin and a polymerizable unsaturated composition suitable for the production of surface coatings and laminates.

Another object of this invention is to produce translucent paper laminates which may be consolidated at low pressures, i. e. less than about 100 p. s. i.

A further object of the present invention is to improve the compatibility of a polymerizable composition including an unsaturated alkyd resin and a substance containing the $CH_2=C<$ group with cellulosic materials such as paper.

A still further object of the present invention is to increase the bonding strength of paper laminates containing a binder including a polymerizable composition containing an unsaturated alkyd resin, and a substance containing the $CH_2=C<$ group.

These and other objects are attained by blending a polymerizable substantially anyhdrous melamine-formeldehyde condensation product alkylated with an alcohol having 1-4 carbon atoms with a compatible polymerizable mixture containing a substance having a $CH_2=C<$ group and having a boiling point of at least 100° C., and a polymerizable unsaturated alkyd resin to form a homogeneous polymerizable composition, having said condensation product and said polymerizable mixture present in a weight ratio between about 1:20 and 3:2, and by employing the composition described as a binder in a laminate, and thereafter polymerizing (curing) said composition at low pressure.

The following examples in which the proportions are in parts by weight are given by way of illustration and not in limitation.

Example 1

Component "A-1" is prepared by blending together 55 parts of an unsaturated alkyd resin (Resin "B") with 45 parts of styrene, while component "B-1" is prepared by blending 80 parts of methylated melamine-formaldehyde resin (condensation product "A") with 20 parts of styrene.

85 parts of component "A-1" and 15 parts of component "B-1" are blended together to form a homogeneous composition, and to this composition about 0.2–0.5% of lauroyl peroxide is added along with about 0.1–0.5% of methyl acid pyrophosphate. This composition is used to impregnate paper such as one of alpha cellulose which is about 0.005 inch in thickness. The resin contained is adjusted to about 60%. An assembly of from several to any desired number of plies of the impregnated paper is placed in a press between polished metal plates at a pressure of about 50 p. s. i. and maintained at a temperature of about 105° C. for about 10 minutes. A laminate having excellent translucency and good physical properties is obtained. Furthermore, the product has good impact strength and it has a smooth, glossy surface.

Example 2

Component "A" is prepared by blending 80 parts of an unsaturated alkyd resin (Resin "A") with 20 parts of styrene, while component "B" is prepared by blending 80 parts of a methylated melamine-formaldehyde resin (100% solids) (condensation product "A") with 20 parts of styrene.

625 parts of component "A" are mixed with 375 parts of component "B" to provide a homogeneous composition having a viscosity of about 378 poises. To this composition 0.5% of lauric peroxide and 0.3–0.4% of methyl acid pyrophosphate are added and intimately mixed with said composition. It is desirable that no air, or as little air as possible, be mixed into the resinous composition while blending component "A" and "B" and while blending the peroxide and pyrophosphate therewith.

A plywood panel is coated with the aforementioned homogeneous composition and shims of about 3 mils in thickness are placed around the edges. Any air which may be entrapped in the resin is allowed to escape, after which a polished plate of glass or metal is placed upon the resin, preferably together with a paper or cloth backing which is used in order to overcome any unevenness of pressure which might result from high spots on the plate. An assembly is now pressed at a pressure of about 100 p. s. i. and at a temperature between about 250° F. and 275° F. for about 8–10 minutes. The assembly is removed from the press and the polished plate is immediately stripped from the plywood. The plywood has a hard craze-resistant coating tenaciously and intricately bonded to the wood fibers. This composition is found to be resistant to cold checking and to have excellent solvent resistance. The coating is not attacked after four hours contact with butyl acetate, absolute ethyl alcohol, 50% acetic acid, 5% sodium hydroxide or 14% ammonia. The coating is also resistant to hot oil.

*Example 3*

Example 2 is repeated except that the homogeneous composition used for the coating applied to the plywood contains 67 parts of component "A", 27 parts of component "B" and 7 parts of styrene. This composition has a viscosity of about 122 poises and is somewhat easier to apply than the composition of Example 1 but it has the disadvantage that it tends to squeeze out during the pressing operation.

*Preparation of Resin "A"*

3.15 mols of ethylene glycol, 2 mols of phthalic anhydride and 1 mol of fumaric acid is mixed together in a suitable reaction vessel and esterified by heating at a temperature of 150–200° C. to form an alkyd resin having an acid number of about 25–60.

*Preparation of Resin "B"*

6 mols of diethylene glycol, 5 mols of fumaric acid and 1 mol of sebacic acid esterified by heating at a temperature of 150–200° C. to produce an alkyd resin having an acid number of about 25–60.

Unsaturated alkyd resins suitable for use in accordance with the present invention are those which are polyesters of an alpha, beta unsaturated dicarboxylic acid with a polyhydric alcohol. Glycols are preferably used as the polyhydric alcohol, and, examples of these are ethylene glycol, diethylene glycol, triethylene glycol, trimethylene glycol, alpha-propylene glycol, octadecandiol, decamethylene glycol, neopentyl glycol, etc. Mixtures of the glycols may be used and the polyesters may be modified with monohydric alcohols and/or monocarboxylic acids.

While any of the alpha, beta unsaturated dicarboxylic acids, including maleic acid, itaconic acid and citraconic acid, may be used, fumaric acid is preferred. Part of the alpha, beta unsaturated dicarboxylic acid may be replaced by other polycarboxylic acids, including succinic acid, adipic acid, sebacic acid, phthalic acid, endomethylenetetrahydrophthalic anhydride etc. The use of a dicarboxylic acid which does not contain an alpha, beta unsaturation subject to polymerization is desirable in order to modify the characteristics of the vinyl polymer and in some cases in order to obtain compatibility with the substance containing the $CH_2=C<$ group with which it is copolymerized.

The term "acid" as used herein is intended to cover anhydride which may be used in place of the acid whenever available.

While it is generally preferable that the polyester contain substantially equivalent proportions of hydroxyl groups and carboxyl groups an excess of hydroxyl groups is desirable in some intances.

The unsaturated alkyd resins should have a low acid number, that is below 100 and preferably below 60. The use of 5–10 mol per cent of glycol in excess of that theoretically required to react with all the acid present is preferable and in general, the resins should be formulated with the alcohol present in slight excess, but resins may also be used which contain about theoretically equivalent proportions of hydroxyl and carboxyl groups.

*Preparation of condensation product "A"*

About 267 parts of 37% aqueous formaldehyde (3.3 mols) are charged into a kettle provided with an agitator and a means for heating. The pH of the aqueous formaldehyde is adjusted to about 8 by means of sodium hydroxide, after which 126 parts of melamine (1 mol) are added. The resulting mixture is heated with agitation until all of the melamine is dissolved, which generally requires a temperature of about 80° C. The resulting syrup is discharged into trays, cooled, and permitted to solidify, which requires about 4–5 hours. The solidified resin thus obtained is broken into lumps and dried at about 50° C. for approximately 10 hours. The hard lumps of resin obtained after drying have a moisture content of about 2–3% and are then ground.

100 parts of the ground melamine-formaldehyde condensation product, prepared in accordance with the above description, are mixed with 200 parts of methanol (95%) in which 0.5 part of crystalline oxalic acid has been dissolved. The resulting mixture is heated in a suitable reaction vessel provided with an agitator and brought to the reflux point and maintained at this point until the melamine-formaldehyde condensation product is all dissolved, which requires about 10–20 minutes. The reacting mixture may be heated for an additional period of time up to a maximum of about 30 minutes. The pH of the resulting syrup is immediately adjusted to about 9–9.5 with 5 N solution of sodium hydroxide. The syrup is now filtered under pressure in a filter press, preferably after the addition of a filter aid such as diatomaceous earth. The filtrate is now concentrated under vacuum at a temperature of about 50°–60° C. under a moderate vacuum which is gradually increased until a vacuum of 26-27" of mercury is obtained. The temperature gradually rises to a maximum of not over about 100° C. When the syrup is substantially completely dehydrated the distillation is stopped, at which point the concentration of resin solids is about 100%. The product is cut back to 80% solids with styrene and about 0.05% or less of hydroquinone or p-tertiary butyl catechol is added as a stabilizing agent.

Alkylated melamine-formaldehyde condensation products may be prepared in general in the manner described in Patent No. 2,197,357, but the methylated condensation products are prepared preferably in accordance with the disclosure in application Serial No. 568,780 filed by Herbert J. West and William T. Watt. The ethylated, propylated or butylated melamine-formaldehyde condensation products are useful but for some purposes the methylated products are preferable.

The styrene employed in the foregoing example may be replaced by other substances containing the $CH_2=C<$ group which have a boiling point above about 100° C. Examples of such substances are vinyl hydrocarbons including o-, m-, p-methyl styrenes, alpha, methyl styrene, 2,4-dimethyl styrene, 2,3 - dimethyl styrene, 2,5 - dimethyl styrene, 2,6 - dimethyl styrene, 3,4 - dimethyl styrene, the isopropenyl toluenes, vinyl naphthalene etc.; and the polyallyl esters such as diallyl phthalate, diallyl terephthalate, diallyl sebacate, diallyl succinate, diallyl maleate, diallyl fumarate, triallyl phosphate, triallyl tricarballylate, diallyl ester of ethylene glycol carbonate, etc. Mixtures of substances containing the $CH_2=C<$ group may be used if desired.

It has been found that my composition containing a methylated melamine - formaldehyde condensation product, a substance containing the $CH_2=C<$ group and an unsaturated alkyd resin is not sufficiently stable for long periods of time and, accordingly, my examples show the preparation of the mixtures in two components, each of which is stable during storage for reasonable periods of time. The two components may be easily blended together and the resulting composition has a work life of from a few hours to a day or more. It has also been found that the working life of the compositions used in accordance with this invention may be improved by the addition of a small proportion, e. g. 0.1-1%, of an acid ester of a phosphoric acid such as methyl acid pyrophosphate employed in the preceding examples. This ester is dimethyl dihydrogen pyrophosphate, but any of the esters of any of the phosphoric acids, which esters contain one or more active (unesterified) hydrogens are useful, such as for example monobutyl orthophosphate, diethyl orthophosphate, monopropyl orthophosphate, dibutyl dihydrogen pyrophosphate, etc.

In order to effect the coopolymerization of the unsaturated alkyd resin with a substance containing the $CH_2=C<$ group it is desirable that a polymerization catalyst be incorporated into our compositions prior to polymerization. Examples of such substances are benzoyl peroxide, benzoyl acetic peroxide, lauric peroxide, coconut oil acid peroxides, oleic peroxide, stearic peroxide, tertiary hydrobutyl peroxide, etc.

My compositions may be used with or without the addition of pigments, dyes, fillers, etc. In some instances it is desirable that a filler such as glass fibers, alpha cellulose pulp, asbestos fibers, mica, etc., be included in my compositions. Similarly, in order to produce opaque materials, pigments such as titanium oxide may be employed.

While my compositions have been found to be especially useful in producing smooth, hard, craze-resistant films or coatings on the surfaces of materials containing cellulose, they may be used as adhesives in the manufacture of plywood or they may be mixed with fillers and used in the production of cast or molded articles. In some cases products produced in accordance with our invention may be applied to textiles or paper for the production of a wide variety of decorative finishes, to change the hand of fabrics, to improve the physical properties of textile materials, etc.

I have found that the melamine-formaldehyde resins alkylated with alcohols of 1-4 carbon atoms are compatible with the copolymerizable compositions and form homogeneous mixtures therewith, while many other melamine-formaldehyde resins are incompatible. I have also found that the methylated melamine-formaldehyde resins have sufficient compatibility or chemical reactivity with cellulose to cause the composition described herein to adhere tenaciously to such cellulosic materials, and to wet the fibers thereof readily. Melamine-formaldehyde resins alkylated with the higher alcohols are generally compatible with copolymerizable mixtures of the type described herein, but they do not have sufficient compatibility with cellulosic fibers to produce laminated materials having sufficient adhesion between the plies, and they do not adhere well to cellulosic surfaces when used as coatings. Accordingly, my compositions which contain the methylated melamine-formaldehyde resins have unique and important properties which are not characteristic of similar compositions containing other melamine-formaldehyde resins.

Obviously many variations and changes in the compositions, processes and products disclosed herein may be made without departing from the spirit and scope of the invention as defined in the appended claim.

I claim:

A homogeneous polymerizable composition which comprises a polymerizable methylated melamine formaldehyde condensation product, a compatible polymerizable mixture containing styrene and a polymerizable unsaturated alkyd resin, obtained by esterifying a mixture including a glycol and fumaric acid, the weight ratio of said condensation product to said polymerizable mixture being between 1:20 and 3:2, and in which said polymerizable mixture contains from 28.6% to 47% by weight of styrene based on the total amount of polymerizable mixture present.

DONALD G. PATTERSON.

REFERENCES CITED

The following references are of record in the file of this patent:

UNITED STATES PATENTS

| Number | Name | Date |
| --- | --- | --- |
| 2,195,362 | Ellis | Mar. 26, 1940 |
| 2,197,357 | Widmer et al. | Apr. 16, 1940 |
| 2,218,474 | Moore | Oct. 15, 1940 |
| 2,255,313 | Ellis | Sept. 9, 1941 |
| 2,280,242 | Kropa | Apr. 21, 1942 |
| 2,305,224 | Patterson | Dec. 15, 1942 |

OTHER REFERENCES

Hodgins et al.: Ind. & Eng. Chem., vol. 33, No. 6, p. 769 (1941).